United States Patent
Durand

[11] Patent Number: 5,821,431
[45] Date of Patent: Oct. 13, 1998

[54] MEASUREMENT SENSOR FOR A LINKING WRENCH BETWEEN TWO MECHANICAL PARTS, AS WELL AS ITS MANUFACTURING PROCESS

[75] Inventor: Didier Durand, Campsas, France

[73] Assignee: Giat Industries, Versailles, France

[21] Appl. No.: 750,135
[22] PCT Filed: Apr. 11, 1996
[86] PCT No.: PCT/FR96/00551
  § 371 Date: Nov. 27, 1996
  § 102(e) Date: Nov. 27, 1996
[87] PCT Pub. No.: WO96/32626
  PCT Pub. Date: Oct. 17, 1996

[30] Foreign Application Priority Data

Apr. 12, 1995 [FR] France ................... 95/04412

[51] Int. Cl.⁶ .................. G01L 1/16; G01L 1/22
[52] U.S. Cl. .................. 73/862.043; 73/862.044
[58] Field of Search ............ 73/862.041, 862.042, 73/862.043, 862.044, 862.045, 862.046

[56] References Cited

U.S. PATENT DOCUMENTS

| | | | |
|---|---|---|---|
| 3,614,488 | 10/1971 | Sonderegger | 73/794 |
| 3,939,704 | 2/1976 | Zipin | 73/862.043 |
| 4,688,421 | 8/1987 | Pzsolla | |
| 4,793,193 | 12/1988 | Borgudd | 73/862.043 |
| 4,802,371 | 2/1989 | Calderara et al. | 73/862.043 |
| 5,063,788 | 11/1991 | Ch'Hayder et al. | |

FOREIGN PATENT DOCUMENTS

| | | |
|---|---|---|
| 0 083 296 | 7/1983 | European Pat. Off. . |
| A-0 396 568 | 11/1990 | European Pat. Off. . |
| 2 529 333 | 12/1983 | France . |
| 30 19 751 | 12/1981 | Germany . |
| 41 01 732 | 7/1992 | Germany . |

*Primary Examiner*—Max H. Noori
*Attorney, Agent, or Firm*—Oliff & Berridge, PLC

[57] ABSTRACT

A measurement sensor for a linking wrench between two mechanical parts and intended to enable a full force wrench with three force components and three moment components to be measured is provided. The sensor comprises six piezoelectric cylinders, whose axes are directed along six directions, two support plates mounted facing one another and respectively in contact with the two end faces of each piezoelectric cylinder, and screws to fasten the six piezoelectric cylinders between the two plates.

11 Claims, 2 Drawing Sheets

MEASUREMENT SENSOR FOR A LINKING WRENCH BETWEEN TWO MECHANICAL PARTS, AS WELL AS ITS MANUFACTURING PROCESS

BACKGROUND OF THE INVENTION

The present invention relates to a measurement sensor for a linking wrench between two mechanical parts.

The sensor proposed by the invention is designed to enable the measurement of a full force wrench, that is: three force components and three moment components exerted between two mechanical parts.

A measurement sensor for a full force wrench is notably described in document EP-A-0 396 568. This sensor is formed of a single metallic part which has two end faces and a central part. The two end faces are intended to be respectively fastened onto a reference body and onto a body generating the forces and the moments. The central part is formed of six beams which longitudinally are in the shape of a spiral. These six beams are placed according to a triangulate architecture closed between the two end faces. Each beam supports means to measure the deformations, these means being formed of strain gauges.

Such a measurement sensor is notably characterised by a relatively low stiffness because of the measurement principle itself which is based on the use of strain gauges. Indeed, for a strain gauge to operate correctly there has to be a certain elasticity in the metal forming the central part of the sensor.

This results in several drawbacks, among which:

a pass-band limited by the sensor's own frequency and by the additional elasticity introduced for the use of the strain gauges, and a displacement along six degrees of freedom or compliance which can be incompatible with certain uses.

In addition, a certain area for bonding and cabling is required in order to set the strain gauges into place on the beams thereby limiting the minimal size of these sensors.

Lastly, once again because of the strain gauge technology, these measurement sensors have fracture safety coefficients which are under 5, which can be very insufficient in certain cases, robotics, for example, or can require the use of oversized sensors with the resulting loss of sensitivity that this solution implies.

SUMMARY OF THE INVENTION

The aim of the invention is to meet the drawbacks of these strain gauge measurement sensors whilst providing other advantages.

To this end, the invention proposes a measurement sensor for a linking wrench between two mechanical parts, which is characterised in that it comprises six piezoelectric cylinders, whose axes are directed along six directions, two support plates mounted facing one another and respectively in contact with the two end faces of each piezoelectric cylinder, and means to mount and fasten the six piezoelectric cylinders between the two plates.

According to one embodiment of the measurement sensor according to the invention, the axes of the six piezoelectric cylinders are directed according to a triaxial structure of ternary symmetry, and the six piezoelectric cylinders are evenly spaced towards the periphery of the two support plates.

To be able to align the piezoelectric cylinder axes along six predetermined directions, the two support plates respectively have two roughly planar main faces facing one another, and six cavities are arranged on each of the main faces, two cavities from each of these faces which are intended to accommodate the ends of a piezoelectric cylinder each having a bearing surface which is perpendicular to the direction along which the piezoelectric cylinder is to be aligned.

According to another characteristic of the sensor according to the invention, each piezoelectric cylinder is axially pierced by a screw forming a means to fasten the cylinder onto the two plates, each screw also forming a prestressing element of the cylinder against the two main faces of the two support plates.

To enable these fastening screws to be mounted, two axially aligned passages are drilled respectively in the two support plates for each screw, the passage which receives the threaded part of the screw being tapped.

Advantageously, an insulating washer is brought around each of the end faces of the piezoelectric cylinders.

The fact of designing a sensor made up of several elements notably offers the advantages of being able to design different ranges of sensors and of being able to easily replace defective elements.

In addition, the use of piezoelectric elements as a measurement means enables the stiffness of the sensor to be notably increased, and the overload coefficient can reach 50 or 100, or even more, without it being necessary to provide a protection mechanism by abutment, for example.

Thus, the great stiffness of the sensor enables uses to be envisaged up to frequencies which are not accessible to strain gauges, and the displacement under load being slight, the measurement of the forces only leads to slight variations in position, which can be advantageous for certain applications, for example in machining.

The invention also relates to a sensor manufacturing process, a process which is characterised in that it consists, from the basis of a cylindrical part made of steel or aluminium, in:

machining in the outer wall of the cylindrical part six cavities evenly spaced around the cylindrical part, each cavity marking out two plane bearing surfaces, parallel to each other and perpendicular to the direction along which a piezoelectric cylinder is to be aligned, drilling in the cylindrical part six passages respectively associated with the six cavities, each passage passing through the associated cavity being drilled along a perpendicular axis to the two bearing surfaces parallel to said cavity, cutting the cylindrical part to obtain two support plates, the cutting plane being perpendicular to the axis of the cylindrical part and passing through the cavities, each cavity being thus sectioned into two parts, setting the two support plates to face each other, so as to introduce a piezoelectric cylinder between the two parts of a same cavity, and introducing a fastening screw into the two axially aligned passages associated with a same cavity, each screw axially piercing the associated piezoelectric cylinder.

Such a manufacturing process has the notable advantage of making the assembly of the piezoelectric cylinders easier without creating mechanical strains during this assembly process.

As a general rule, the applications of a sensor according to the invention concern all industrial sectors, among which by way of example:

industrial robotics (measurement of contact load, . . . )

robot remote control (load sensitive return, operating handle, . . . )

test benches for mechanical structures (blowers, hull test tanks . . . )

machine tools (cutting load measurement, vibration measurement, . . . )

biomechanics (sporting performance measurement, physiotherapy, . . . )

and ballistics (reaction force measurement, calculation of the impact energy at a point of impact, of a direction of thrust, . . . ).

BRIEF DESCRIPTION OF THE DRAWINGS

Other advantages, characteristics and details of the invention will become apparent from the explanatory description which follows made in reference to the appended drawings, given merely by way of example and in which.

DETAILED DESCRIPTION OF PREFERRED EMBODIMENTS

Figure 1:
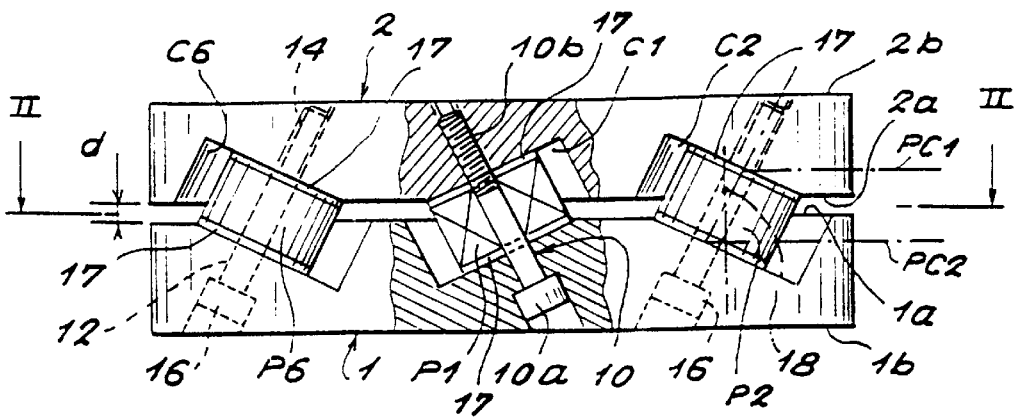
FIG. 1 is a schematic section view of a measurement sensor according to the invention.
Figure 2:
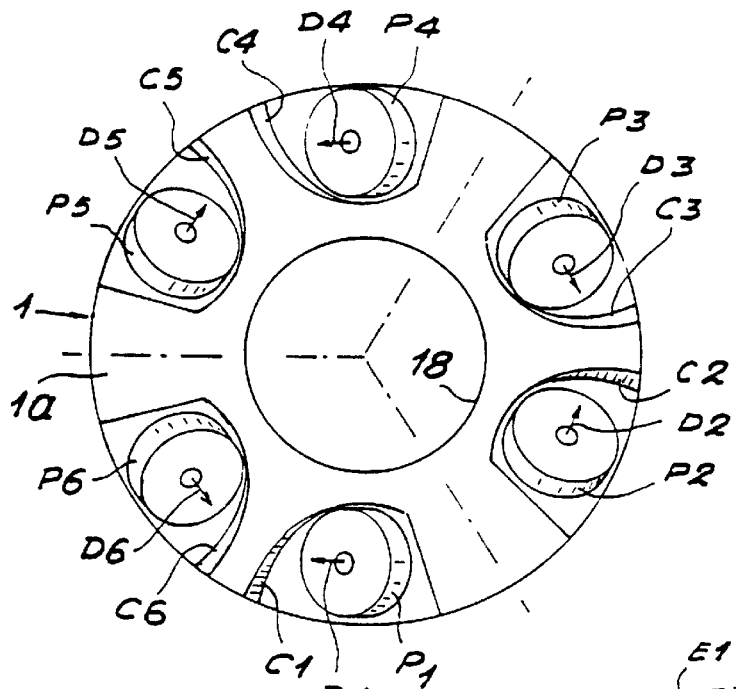
FIG. 2 is a section view according to line II—II in FIG. 1.

A measurement sensor according to the invention and such as illustrated in FIGS. 1 and 2 is formed of several components assembled together, that is:

two metallic support plates 1 and 2, made of steel or aluminium, placed facing each other, and measurement devices formed of six piezoelectric cylinders P1 to P6 placed between the two plates 1 and 2.

Each plate 1 and 2 is for example of a circular shape and has two roughly planar main and opposite faces 1a, 1b for plate 1 and 2a, 2b for plate 2.

The two plates 1 and 2 are situated facing each other with their main faces 1a and 2a lying opposite one another and separated by a distance d.

The six piezoelectric cylinders P1 to P6 are placed between the two faces 1a and 2a of the two plates 1 and 2, and their axes are directed along six directions D1 to D6 to form a triaxial structure of ternary symmetry which is indeformable, for example. As can be seen from FIG. 2, the six piezoelectric cylinders P1 to P6 are evenly spaced towards the periphery of the two plates 1 and 2.

Figure 3:
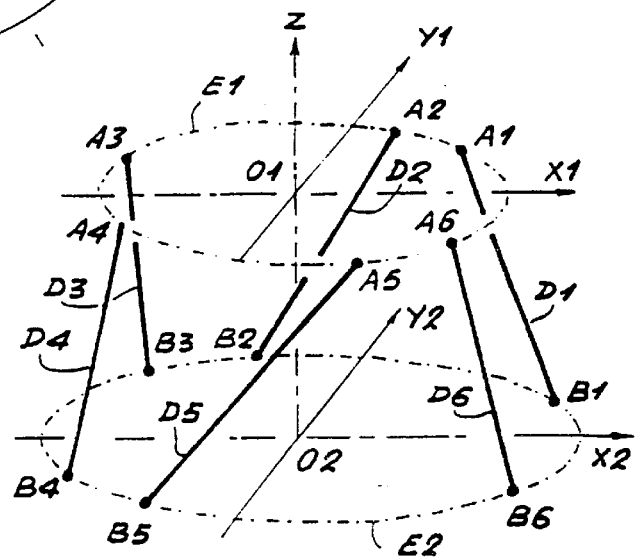
FIG. 3 is a perspective view of the general principle enabling the direction of the piezoelectric cylinders of the sensor to be defined, and FIGS. 4a to 4e schematically illustrate a manufacturing process for a sensor according to the invention.

With reference to FIG. 3, a general principle has been shown in a perspective view enabling directions D1 to D6 of the axes of the six piezoelectric cylinders P1 to P6 to be defined. More precisely, the two parallel cutting planes PC1 and PC2 (FIG. 1) which pass respectively through the centres of the two end faces of the piezoelectric cylinders P1 to P6 have been considered. These centres A1 to A6 for cutting plane PC1 and B1 to B6 for cutting plane PC2 are respectively on two circles which do not necessarily have the same diametre, these two circles are represented by two ellipses E1 in plane X1-O1-Y1 and E2 in plane X2-O2-Y2 on the perspective in FIG. 3.

In practical terms, the six points A1 to A6 are spaced around a circle along a ternary symmetry, that is three pairs of points A1–A2, A3–A4 and A5–A6 are defined spaced at 120° from one another. In a similar manner, the six points B1 to B6 are also spaced along a ternary symmetry, and the six directions D1 to D6 are respectively defined by the six pairs of points A1–B1 to A6–B6.

The choice of the position of points A1 to A6 and B1 to B6 is carried out according to the conditions of use of the sensor and is therefore not necessarily predetermined.

The two end faces of each cylinder P1 to P6 respectively come into contact with the faces 1a and 2a of plates 1 and 2. To be able to align the axes of these cylinders P1 to P6 along directions D1 to D6, six suitable cavities C1 to C6 are arranged on each of faces 1a and 2a of plates 1 and 2.

Considering, for example, piezoelectric cylinder P6, cavity C6 of plate 1 in which one end of cylinder P6 is to engage has a planar surface S1 which is perpendicular to direction D6 along which cylinder P6 is to be aligned, and cavity C6 of plate 2 in which the other end of cylinder P6 is to engage has a planar bearing surface S2 which is also perpendicular to direction D6 along which cylinder P6 is to be aligned, these two surfaces S1 and S2 being parallel to one another. The cavities for the other cylinders P1 to P5 have the same characteristics.

Fastening means are provided to assemble the piezoelectric cylinders P1 to P6 to the two plates 1 and 2. In practical terms, a fastening means is provided per cylinder, a means which is formed by a screw 10 which axially pierces the cylinder.

To this end, the plate incorporates six passages 12 which are drilled between two main faces 1a and 1b of plate 1 along parallel axes to the six directions D1 to D6. Each passage 12, on the main face 1a of the plate 1, opens out at the surface S1 of an associated cavity and perpendicularly to surface S1. In an analogous manner, plate 2 incorporates six passages 14 which are drilled between the two main faces 2a and 2b of plate 2 along axes which are parallel to directions D1 to D6. Each passage 14, on the main face 2a of plate 2, opens out at surface S2 of an associated cavity and perpendicularly to this surface S2.

On the main face 1b of plate 1, a countersink 16 is for example machined around each passage 12 to be able to house the head 10a of a screw 10, and passage 14 of plate 2 which is axially aligned with passage 14 is tapped to work positively in conjunction with the threaded part 10b of the screw 10. An insulating washer 17 is advantageously brought around each end face of the piezoelectric cylinders P1 to P6. The electrical outputs (not shown) of the sensor are located at the piezoelectric cylinders and are connected to processing circuits to carry out measurements of the strains received by each piezoelectric cylinder. The central part of each plate 1 and 2 can be drilled with a central clearance opening 18. This opening 18, machined by removing material, enables the sensor to be made lighter and can, for example, be used for the passage of cables. Lastly, a cap can be put onto the sensor which nevertheless leaves the two outer end faces 1b and 2b of the two plates 1 and 2 free to enable them to be fastened between two mechanical parts.

To make the sensor easier to assemble, notably the assembly of the piezoelectric cylinders P1 to P6, the invention also proposes a manufacturing process which consists, from the basis of a cylindrical metal part 20 made of, for example steel or aluminium, in carrying out the operations described hereafter with reference to FIGS. 4a–4e.

Figure 4:
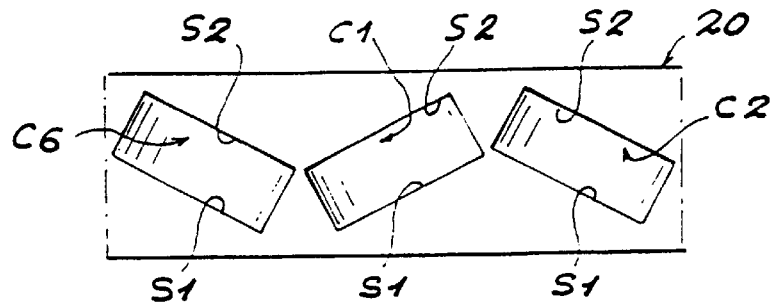
Figure 4:
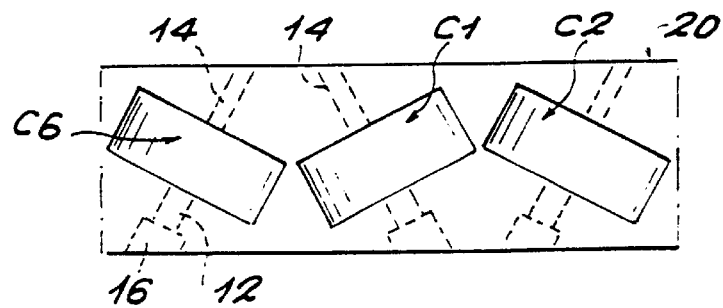
Figure 4:
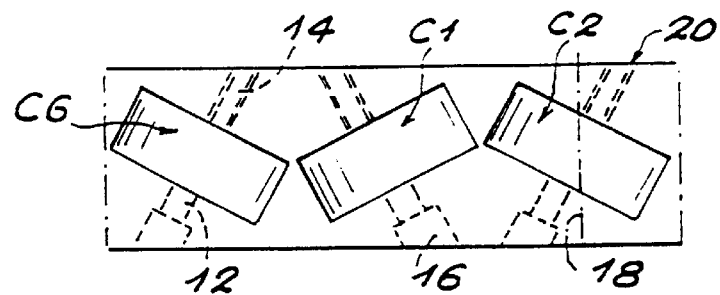
Figure 4:
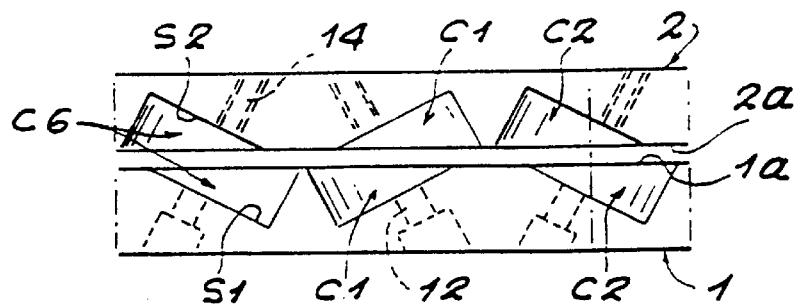
Figure 4:
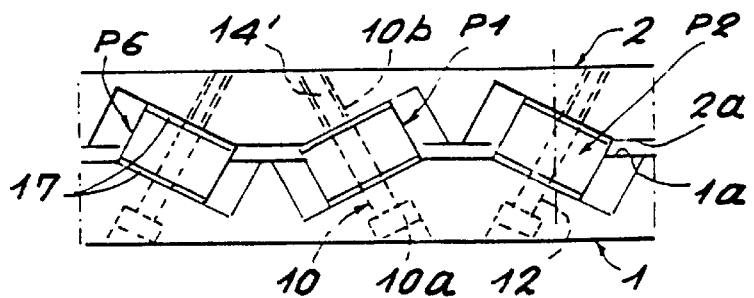

A first stage of the process, illustrated in FIG. 4a, consists in machining, on the outer wall of the cylindrical part 20, six cavities C1 to C6 evenly spaced around the cylindrical part 20, each cavity marking out two plane bearing surfaces S1 and S2, parallel to each other and perpendicular to the direction along which a piezoelectric cylinder associated with each cavity is to be aligned. The distance separating the two surfaces S1 and S2 corresponds to the thickness of the piezoelectric cylinders which will be assembled afterwards.

In a second stage illustrated in FIG. 4b, six passages are drilled in the cylindrical part 20 respectively associated with the six cavities C1 to C6, each passage passing through the associated cavity and being drilled along an axis which is perpendicular to the two surfaces S1 and S2 of said cavity, such as to mark out the two axially aligned passages 12 and 14 illustrated in FIG. 1. Thereafter, countersinks 16 are machined around the apertures of these passages 12 which open out to the outside of the cylindrical part 20.

In a third stage illustrated in FIG. 4c, additional machining is carried out, notably the drilling of the central opening 18 and the tapping of the passages 14.

In a fourth stage illustrated in FIG. 4d, the cylindrical part 20 is cut so as to obtain two plates 10 and 12, the cutting plane being perpendicular to the axis of the cylindrical part 20 and passing through cavities C1–C6, each cavity thereby being sectioned into two parts.

In a final stage illustrated in FIG. 4e, the piezoelectric cylinders P1 and P6 are assembled in cavities C1 to C6 and are fastened in place by means of screws 10.

According to one functioning mode of the above-described sensor, the load transmitted, for example, by plate 1 can be shown by a wrench T(t). This wrench notably creates tensile/compression stress on the piezoelectric cylinders P1–P6, and these stresses generate electrical charges which, after integration, become electrical voltages.

If we represent by V(t) the vector formed by the six voltages from piezoelectric cylinders P1–P6, any wrench T generates, in the pass-band of the sensor, a linear response of the type:

$$V(t) = [M] \times T(t)$$

where [M] is the transfer matrix (6×6) of the sensor.

Knowing V(t) which is the vector of the measurements supplied by the sensor, the wrench is calculated as follows:

$$T(t) = [M]^{-1} \times V(t) = \begin{matrix} Tx(t) \\ Ty(t) \\ Tz(t) \\ Mx(t) \\ My(t) \\ Mz(t) \end{matrix}$$

where [M] must be known by being calculated or identified.

One way to know [M] is to proceed by an identification means on a test bench. In this technique, the sensor is subjected to a series of known wrenches T (t). The method of the generalised least error squares is applied to determine the matrix [M]. As the number of tests can be very much above the order of the matrix being sought after, the pseudo-inverse method is used:

$$[M] = [V^T V]^{-1} V^T . T$$

The first three components of the wrench Tx(t), Ty(t), Tz(t) are the three force components and Mx(t), My(t) and Mz(t) are the three moment components, given that the reference mark is the one in which the matrix [M] is expressed.

I claim:

1. A measurement sensor for a linking wrench between two mechanical parts and intended to enable a full force wrench with three force components and three moment components to be measured, comprising:

six piezoelectric cylinders, whose axes are directed along six directions;

two support plates mounted facing one another and respectively in contact with two end faces of each piezoelectric cylinder; and means to fasten the six piezoelectric cylinders between the two support plates, wherein the two support plates respectively have two planar main faces parallel and facing one another, and six cavities arranged on each of the main faces, two cavities from each of the main faces accommodating the ends of one of the piezoelectric cylinders having a bearing surface which is perpendicular to the direction along which the piezoelectric cylinder associated with said cavities is aligned.

2. A measurement sensor according to claim 1, wherein the axes of the six piezoelectric cylinders are directed according to a triaxial structure of ternary symmetry.

3. A measurement sensor according to claim 1, wherein the six piezoelectric cylinders are evenly spaced towards a periphery of the two support plates.

4. A measurement sensor for a linking wrench between two mechanical parts and intended to enable a full force wrench with three force components and three moment components to be measured, comprising:

two support plates mounted facing one another;

six piezoelectric cylinders, the piezoelectric cylinders being evenly spaced towards a periphery of the two support plates and having their axes directed along six directions, the two support plates being respectively in contact with two end faces of each piezoelectric cylinder; and means to fasten the six piezoelectric cylinders between the two support plates, wherein the two support plates respectively have two planar main faces parallel and facing one another, and six cavities arranged on each of the main faces, two cavities from each of the main faces accommodating the ends of one of the piezoelectric cylinders having a bearing surface which is perpendicular to the direction along which the piezoelectric cylinder associated with said cavities is aligned.

5. A measurement sensor according to claim 4, wherein each piezoelectric cylinder is axially pierced by a screw forming a means to fasten the cylinder onto the two plates, each screw also forming a prestressing element of the piezoelectric cylinder against the two main faces of the two support plates.

6. A measurement sensor according to claim 5, wherein each fastening screw is engaged in two passages which are axially aligned and drilled in the two plates.

7. A measurement sensor according to claim 5, further comprising an insulating washer brought around each of the end faces of the piezoelectric cylinders.

8. A manufacturing process for a measurement sensor for a linking wrench between two mechanical parts and intended to enable a full force wrench with three force components and three moment components to be measured, the measurement being carried out by means of six piezoelectric cylinders, whose axes are directed along six directions, the method comprising the steps of:

machining in an outer wall of a cylindrical part six cavities evenly spaced around the cylindrical part, each cavity comprising two planar bearing surfaces, parallel to each other and perpendicular to a direction along which a piezoelectric cylinder is to be aligned, drilling in the cylindrical part six passages respectively associated with the six cavities, each passage passing through the associated cavity being drilled along a perpendicular axis to the two bearing surfaces parallel to said cavity, cutting the cylindrical part to obtain two support plates, the cutting plane being perpendicular to a central axis of the cylindrical part and passing through the cavities, each cavity being thus sectioned into two parts, setting the two support plates to face each other, so as to introduce a piezoelectric cylinder whose end faces respectively press on the two bearing surfaces, and introducing respectively six fastening screws into the six passages, each screw axially piercing the associated piezoelectric cylinder.

9. A process according to claim 8, further comprising directing the six piezoelectric cylinders in a triaxial structure of ternary symmetry.

10. A process according to claim 8, wherein the cylindrical part is made of one of steel or aluminum.

11. A measurement sensor according to claim 4, wherein the axes of the six piezoelectric cylinders are directed according to a triaxial structure of ternary symmetry.

* * * * *